B. GAINES.
TOY.
APPLICATION FILED SEPT. 23, 1911.

1,018,311.

Patented Feb. 20, 1912.
2 SHEETS—SHEET 1.

Inventor
Bert Gaines.

Witnesses
D. B. Galt.

By Victor J. Evans
Attorney

B. GAINES.
TOY.
APPLICATION FILED SEPT. 23, 1911.
1,018,311.
Patented Feb. 20, 1912.
2 SHEETS—SHEET 2.
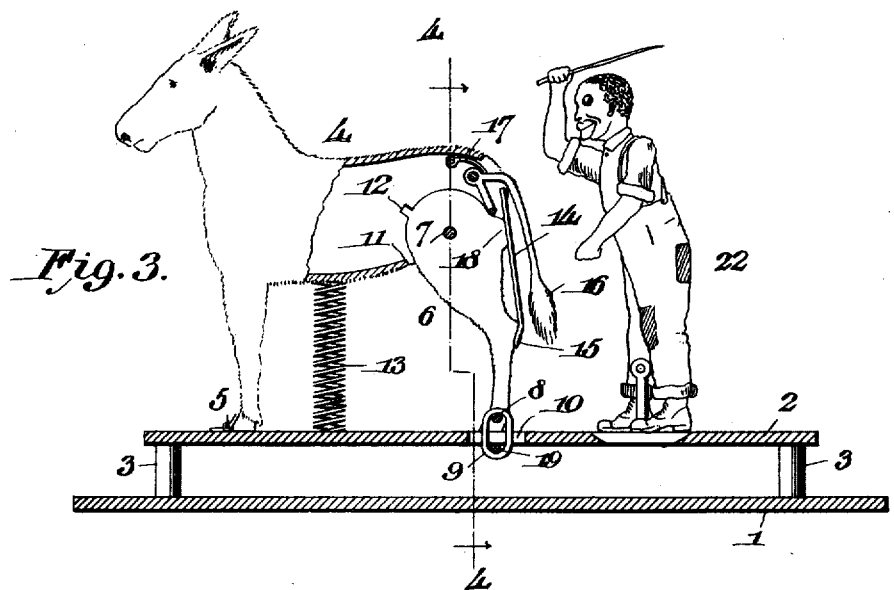
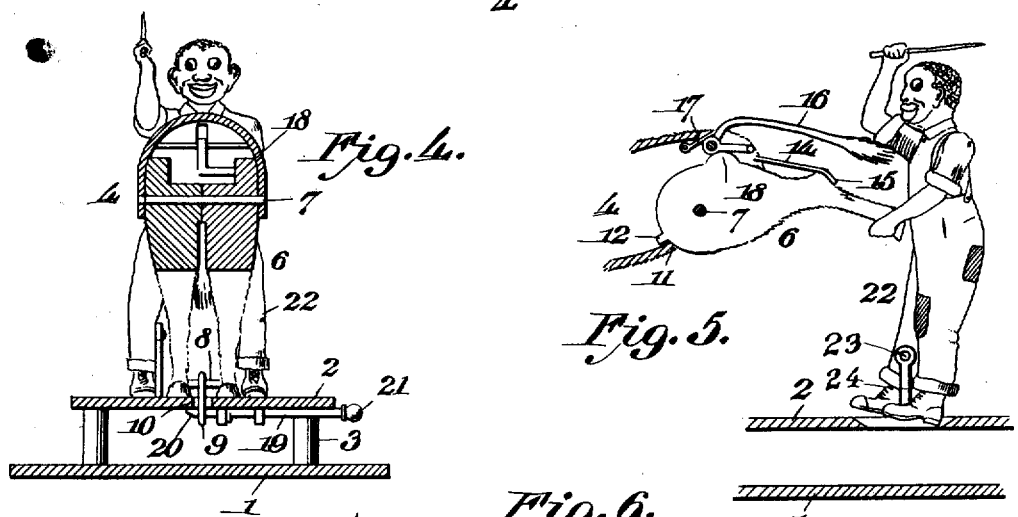
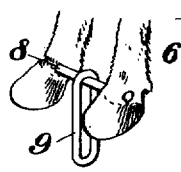
Witnesses
Inventor
Bert Gaines.
By Victor J. Evans
Attorney

UNITED STATES PATENT OFFICE.

BERT GAINES, OF DAYTON, OHIO.

TOY.

1,018,311.  Specification of Letters Patent.  Patented Feb. 20, 1912.

Application filed September 23, 1911. Serial No. 650,903.

*To all whom it may concern:*

Be it known that I, BERT GAINES, a citizen of the United States, residing at Dayton, in the county of Montgomery and State of Ohio, have invented new and useful Improvements in Toys, of which the following is a specification.

This invention relates to toys, and has for an object to provide a device of this character which will include the animal representation of a mule or the like having associated therewith a figure representing the driver or attendant, means being provided whereby the animal is adapted for movement so that the legs of the animal will be brought against the driving figure to present the impression of his being kicked.

Figure 1:
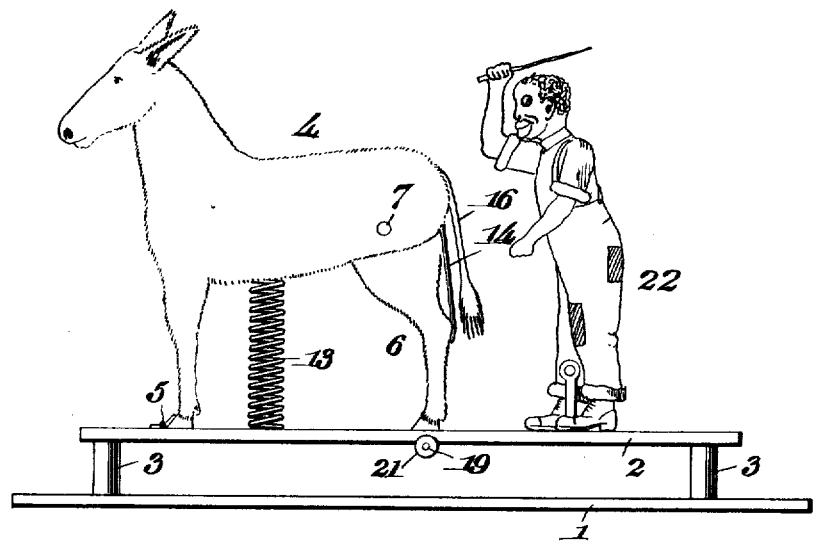
Figure 2:
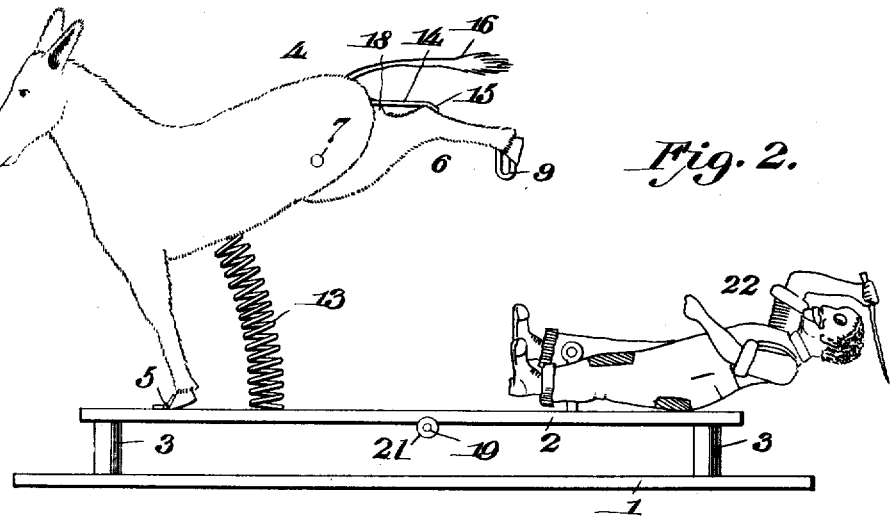

In the drawings, forming a portion of this specification and in which like numerals of reference indicate similar parts in the several views:—Figure 1 is a side view of the toy showing both of the figures in set positions. Fig. 2 is a similar view showing both of the figures in tilted positions. Fig. 3 is a vertical section taken longitudinally through the toy. Fig. 4 is a transverse section on line 4—4 of Fig. 3. Fig. 5 is a section on an enlarged scale through a portion of the body of the animal and through the hind legs and the tail of the animal. Fig. 6 is a perspective view of a portion of the animal figure.

The toy comprises a main platform 1 and a supplemental platform 2. These platforms are superimposed with respect to each other and they are connected together and spaced apart by the posts 3. The animal figure 4 may represent a mule, horse, cow, or like kicking animal, and as shown, the figure is disposed above the supplemental platform and it has its fore legs hinged, at 5, to the platform so as to permit of the kicking-like movements being imparted to the animal as will be hereinafter described.

The hind legs 6 of the animal are pivoted, at 7, to the body of the animal. The hind legs are connected with each other at their lower ends by a member 8 which has formed thereon a small ring or keeper 9 which is adapted to be extended downwardly through the passage 10 in the supplemental platform. The body of the animal 4 is provided with a stop shoulder 11 against which the stop shoulder 12 of the hind legs 6 may be brought to bear, the purpose of this construction being to limit the pivotal movement of the legs in one direction. A spring 13 is interposed between the supplemental platform and the animal figure 4. An elastic member 14 such as a rubber-band, metal spring or the equivalent thereof is connected, at 15, to the hind legs of the animal. This elastic member is also connected to the body portion of the animal so that under the elasticity or tension of the member the legs may be moved rapidly to kicking positions. The tail 16 is hingedly mounted on the body portion of the animal and a spring 17 is employed to hold the tail in relatively close proximity to the hinged ends of the hind legs 6. Adjacent to the hinged ends of the hind legs and fixedly supported on the legs is an actuating member 18 which is designed to engage the tail 16 to move the same in an upward direction. This occurs during the kicking movement of the animal.

A latch member 19 is movably mounted beneath the supplemental platform 2 and it is provided with a beveled portion 20 which is designed to engage in the ring or keeper 9 so as to hold the legs 6 in set position and to also hold the animal against the tension of the spring 13. The latch member is provided with an actuating portion 21 which is disposed at one side of the supplemental platform and positioned thereon so that it may be engaged by the hand and manipulated so as to permit of the disengagement of the latch member from the ring. When the latch member is disengaged from the keeper it will of course be understood that under the tension of the spring 13 the animal will be moved on its pivot and under the tension of the elastic member 14 the legs 6 will be thrown upwardly in kicking position.

A figure 22 representing the attendant or driver of the animal is pivotally mounted, at 23, upon the supporting post 24 on the supplemental platform. The figure is located directly behind the legs 6 of the animal 4, being disposed in position with respect thereto so as to be engaged by the legs of the animal.

From the construction of the device described it will be seen that when the figures 4 and 22 are in their set positions as shown in Fig. 1, they are relatively associated so that the figure 22 will be positively tilted by the figure 4 on movement of the latter to kicking position so as to present the amusing effect of the animal kicking its driver.

I claim:

1. A toy comprising an animal figure, means supporting the figure for tilting movement, means for tilting the figure, movable legs on the figure, means for holding the animal including the legs against movement, a movable member located behind the figure and disposed in the path of the movable legs thereof, the said animal figure having a movable tail, and means on the movable legs of the animal for moving the tail on movement of the legs to kicking position.

2. A toy comprising an animal figure, means for supporting the figure for tilting movement, means for tilting the figure, movable legs on the figure, means for holding the figure including the legs against movement, a movable member located behind the figure and disposed in the path of the movable legs thereof, a stop on the figure, and a stop on the legs adapted to engage the stop on the figure to limit the movement of the legs in one direction.

In testimony whereof I affix my signature in presence of two witnesses.

BERT GAINES.

Witnesses:
 GLADYS DOWNING,
 LULA FAULSTICK.

Copies of this patent may be obtained for five cents each, by addressing the "Commissioner of Patents, Washington, D. C."